Figure 1:
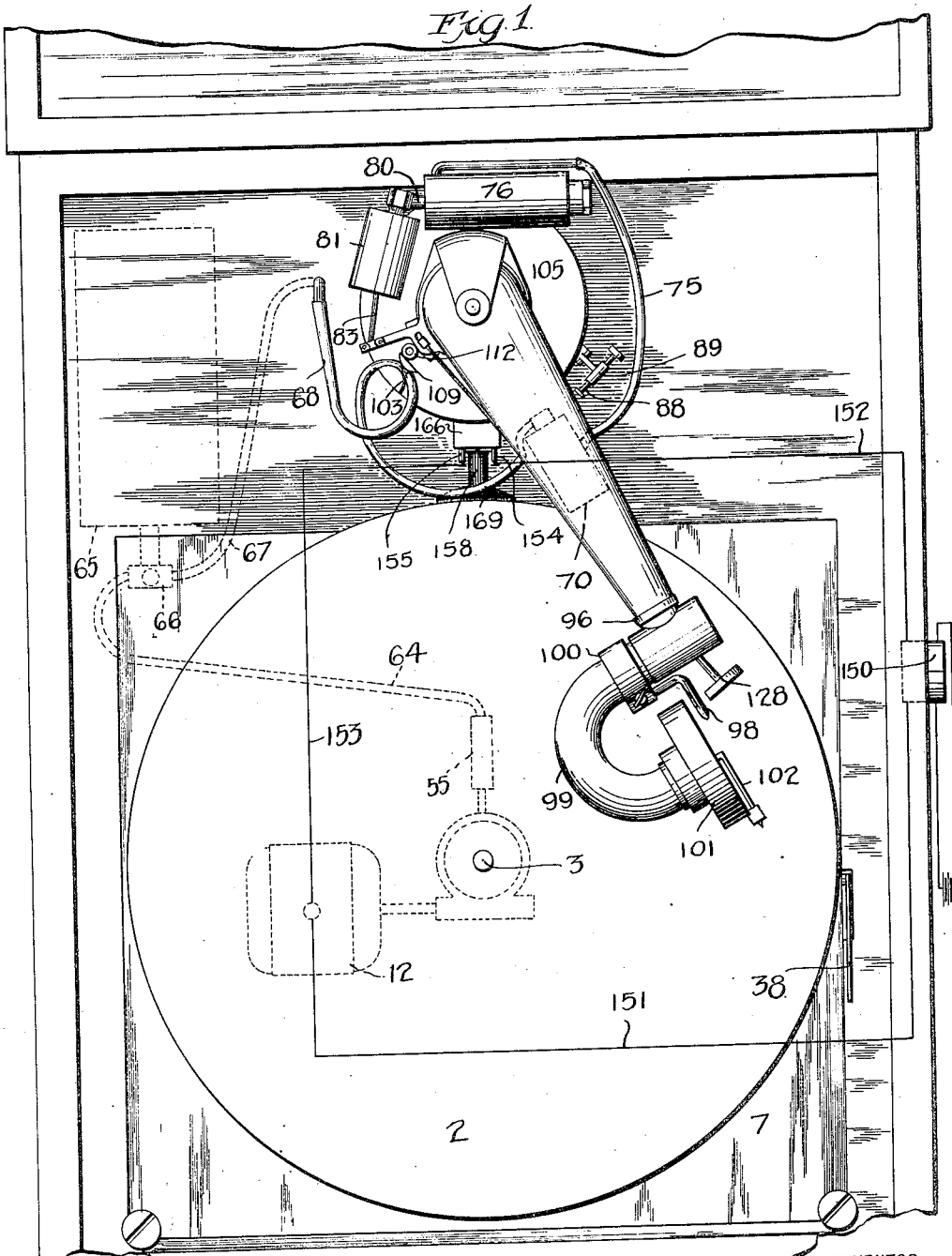

A. F. MADDEN.
MOTOR DRIVEN PHONOGRAPH.
APPLICATION FILED JULY 7, 1914.

1,127,056.

Patented Feb. 2, 1915.

5 SHEETS—SHEET 1.

WITNESSES
Geo. A. Senior
Isabel Morris

INVENTOR
Albert F. Madden
BY
Strueger Bro
ATTORNEYS

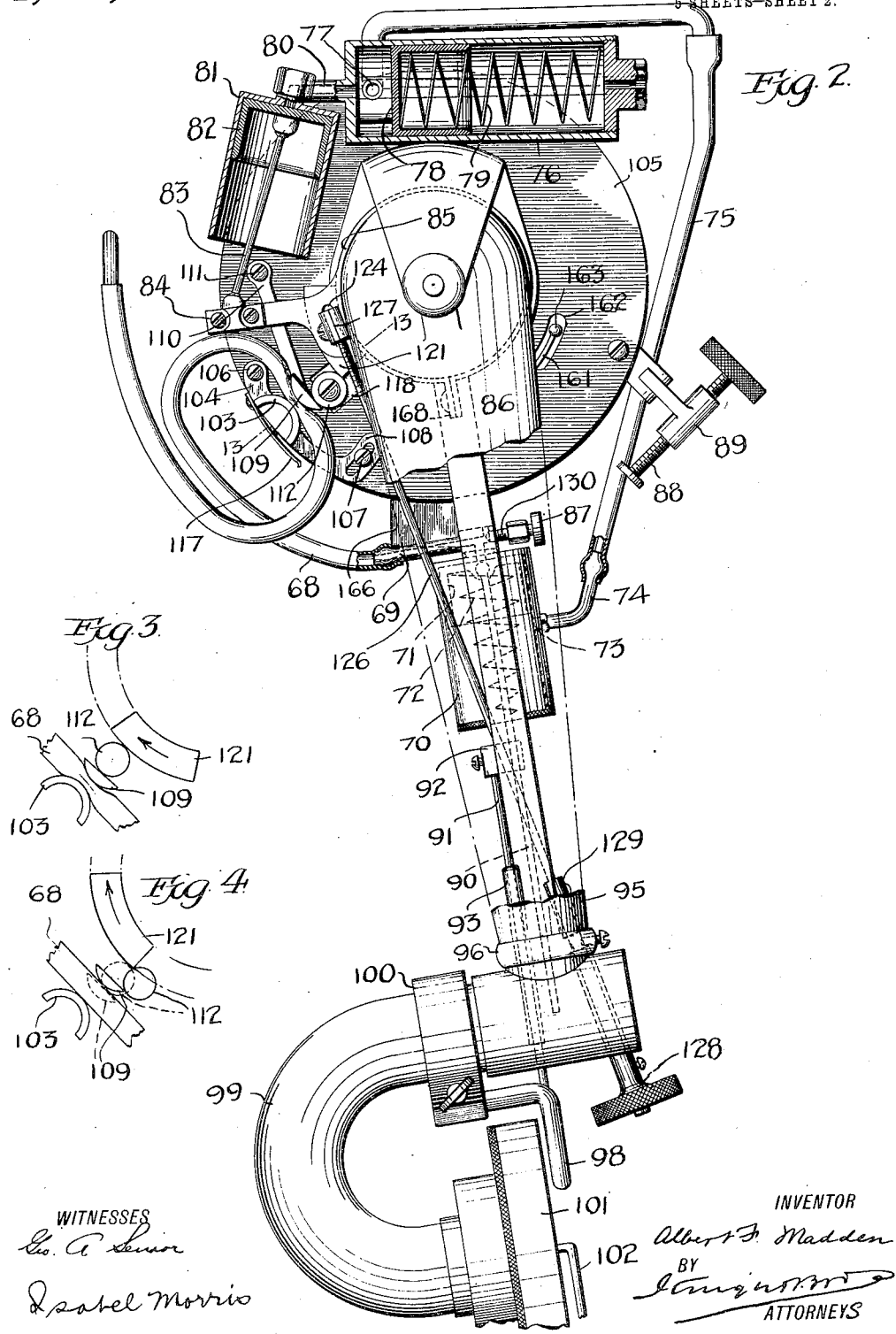

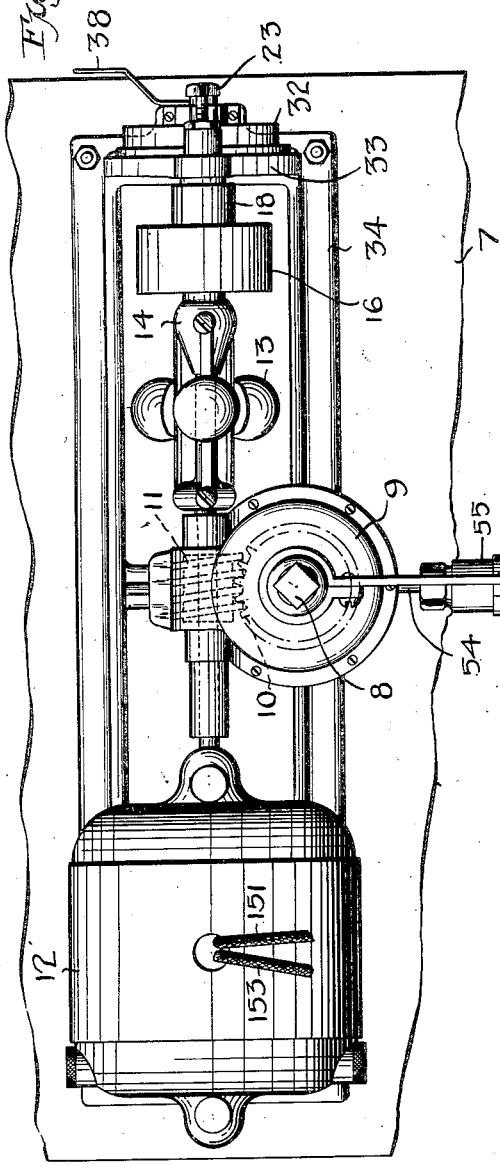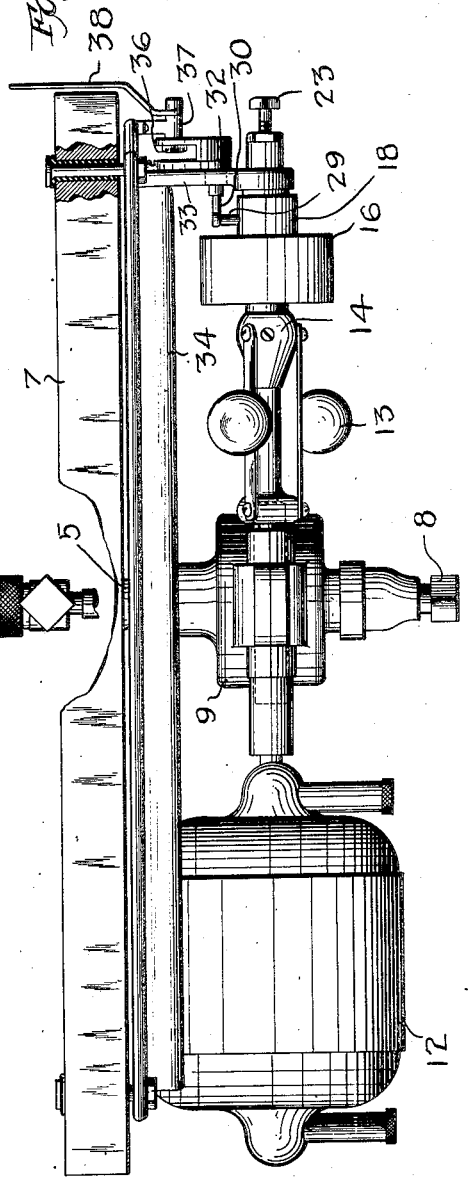

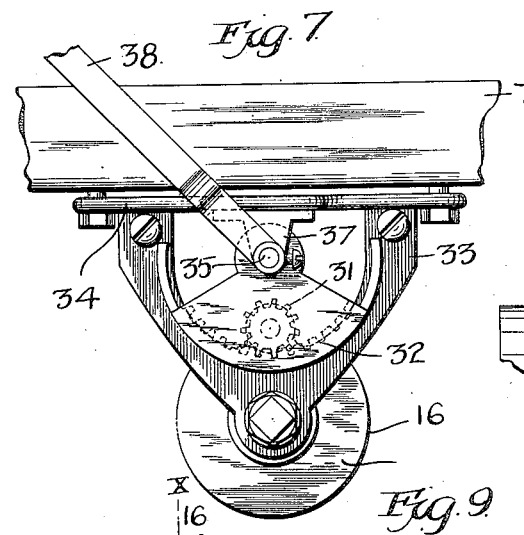
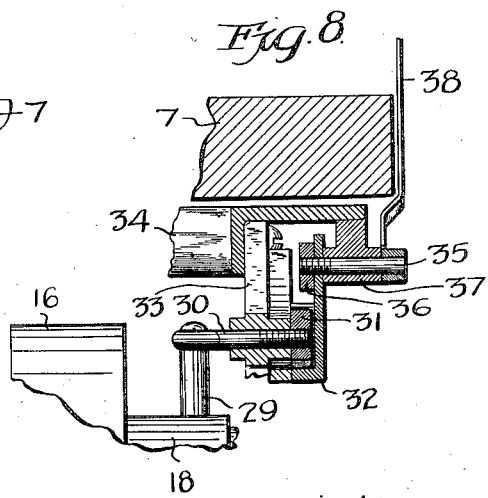
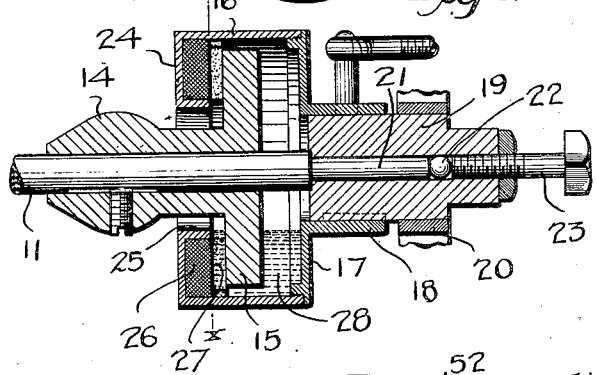
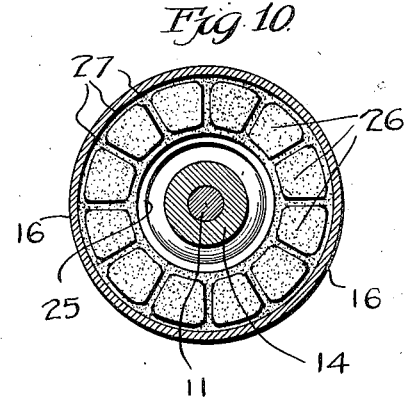
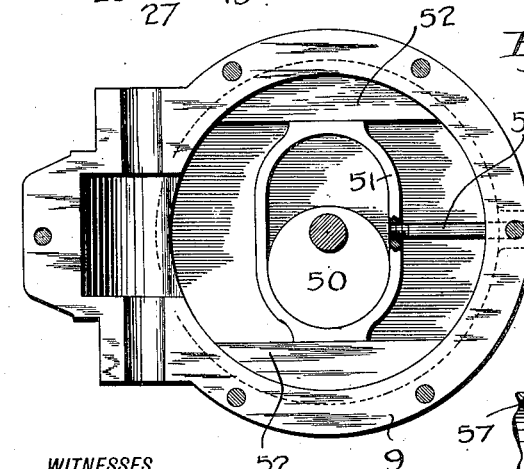
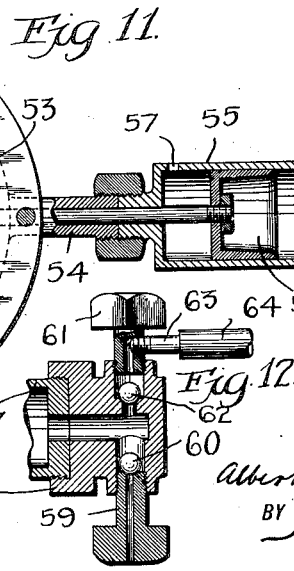

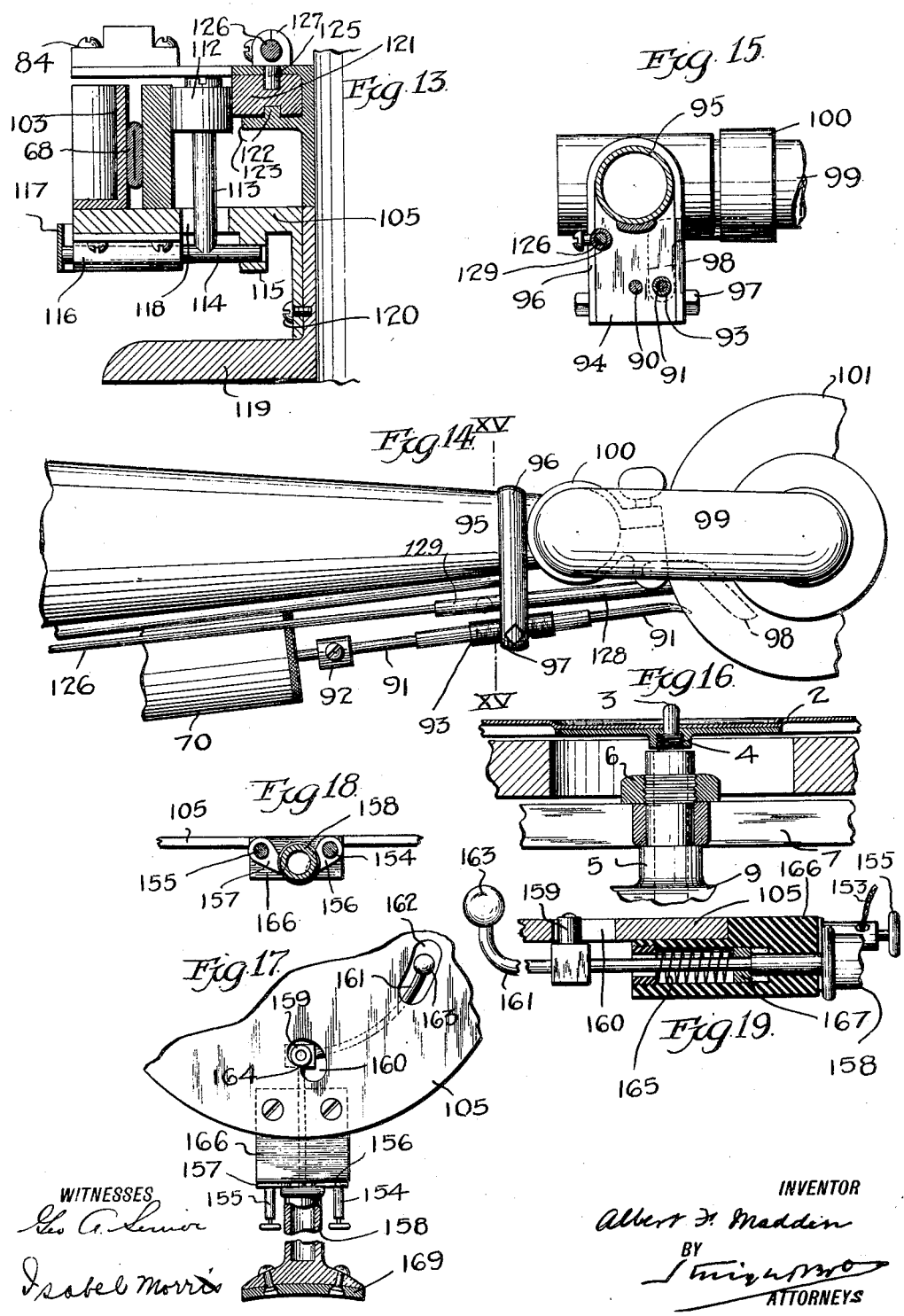

UNITED STATES PATENT OFFICE.

ALBERT F. MADDEN, OF NEWARK, NEW JERSEY.

MOTOR-DRIVEN PHONOGRAPH.

1,127,056.  Specification of Letters Patent.  Patented Feb. 2, 1915.

Application filed July 7, 1914. Serial No. 849,432.

*To all whom it may concern:*

Be it known that I, ALBERT F. MADDEN, a citizen of the United States, residing in the city of Newark, county of Essex, State of New Jersey, have invented certain new and useful Improvements in Motor-Driven Phonographs, of which the following is a full and clear specification.

My invention relates in general to phonographs of the disk type and more especially to motor driven phonographs in which mechanism is provided for automatically stopping and repeating the reproduction.

In order to indefinitely repeat the reproductions on phonographs, it is desirable that some form of power drive be employed which is continuous in its operation, that is to say, to avoid the necessity of intermittent winding or storing of power in the usual drive mechanism as takes place in the usual spring motor driven phonographs. Power is also necessary to actuate the repeating mechanisms. The term "motor" as employed herein, is intended to indicate a power motor, preferably electric, to distinguish the driving means from the usual spring power drive mechanism in which the energy is stored by a manual operation in the act of winding.

It has heretofore been proposed to employ the electric motor for driving phonographs. Due to the variation in line voltage which is usually experienced in the operation of electric motors, considerable difficulty has been met in applying the electric motor drive to phonographs. The pitch of the tone reproduced by the phonograph, is of course under the direct influence of the speed at which the record is driven, and the slightest perceptible variation in the speed of the record interferes with the quality of the reproduction. It will therefore be apparent that the success of a repeating phonograph depends in a large measure upon the proper control of the driving mechanism employed and that the use of an electric motor can be practicable only when accompanied by a positive and reliable speed control for the motor.

According to my invention I employ preferably an electric motor in conjunction with a reliable governor of special design, and this source of power is utilized for the driving of the phonograph and also as a source of power for the actuating mechanism of the repeating devices.

The invention will be more clearly understood from the description of a specific embodiment of the invention which I have illustrated by way of example in the accompanying drawings.

It will be understood that the details of construction herein shown are only given to enable those skilled in this art to understand the principles of my invention and to make and use the same, as it will be apparent that the principles which form the basis of my present invention may be applied or utilized in many different constructions while still gaining the desired results.

In said drawings: Figure 1 is a top plan view of the apparatus showing the location of the various elements. Fig. 2 is a similar view of the reproducing and repeating mechanism, parts being shown in horizontal section. Figs. 3 and 4 are diagrammatic details illustrating the operation of one of the valve mechanisms employed. Fig. 5 is an underneath plan view of the electric motor and speed control devices. Fig. 6 is a front elevation of the same. Fig. 7 is a side elevation of the manually operated speed regulator. Fig. 8 is a front vertical section of the same. Fig. 9 is a similar view of the friction brake running in oil. Fig. 10 is a face view of the friction surface employed. Fig. 11 is a top plan view with parts in horizontal section, showing the compressor for the repeating system, and its driving connection. Fig. 12 is a vertical section of the valves employed in the compressor. Fig. 13 is a vertical section of the cam operated valve device for controlling the supply of air under pressure to the repeating devices. Fig. 14 is a side elevation illustrating in detail the outer end of the reproducer arm and parts of the repeating devices. Fig. 15 is a transverse sectional elevation on line XV—XV of Fig. 14. Fig. 16 is a detail vertical section showing the main shaft or arbor and turn-table of the phonograph. Fig. 17 is a detail plan view with parts in section showing the electric switch and its control device. Fig. 18 is a transverse section of the switch plunger. Fig. 19 is a longitudinal section through the switch plunger and its control mechanism.

Referring more specifically to said drawings, 1 indicates the cabinet of the machine, 2 the turn-table or record support, and 3 the main shaft or arbor by which the turn-table and record are supported and driven. The turn-table 2 is threaded on to the arbor 3 at the point 4, and the arbor rotates in a bearing 5, which is secured by threaded collar 6 resting upon the support 7, which forms a part of the cabinet 1. (See Fig. 16.) The arbor 3 rests upon a step bearing indicated at 8 in Figs. 5 and 6. Arbor 3 passes through a housing 9 within which a worm gear 10 secured on said arbor operates under the influence of a worm shaft 11, driven by electric motor 12. Shaft 11 has operatively coupled therewith a ball governor 13, the sliding member 14 of which terminates in a disk 15 within the friction brake housing 16, as illustrated in Fig. 9. The housing 16 has threaded into it a head portion 17, the tubular extension 18 of which is slidably mounted upon a bearing stud 19, which is fixed in the framework 20. Stud 19 is formed with an axial bore in which the reduced end 21 of the shaft 11 is journaled. A ball stop 22 is positioned in said bore by the set screw 23. The inner face 24 of the housing 16 has a tubular inward extension 25 projecting axially toward the disk 15 of the sliding member 14, and in the annular pocket thus provided, a friction body of leather or other suitable material 26 is disposed having its exposed face provided with radial grooves 27.

The space within the housing 16 is supplied with a body of lubricating oil 28 in which the disk 15 runs. The disk 15 engages the friction material 26 and tends to retard the rotation of the shaft 11. During the rotation of the disk 15, lubricating oil is continuously carried around by the disk so that the entire surface of the friction material 26 is thoroughly lubricated, this result being aided by the grooves 27 formed in the lubricating material 26, whereby the lubricating oil is better presented. The high speed of the motor and disk necessitates a thorough and constant lubrication of the friction surface at all times, as otherwise it would be impossible to accurately control the speed of the drive, due to irregular friction and generation of heat. It is this difficulty which has heretofore stood in the way of the successful application of the motor drive to phonographs.

The friction exerted between the material 26 and the disk 15 may be manually regulated. For this purpose the housing 16 is slidably mounted on the stud 19, as above referred to, and any suitable regulating mechanism may be employed for controlling the position of the housing 16. I have herein shown this regulating mechanism as comprising a pin 29 which engages in a perforation formed in sleeve 18, and which is operated axially, of shaft 11 by a screw 30 slid in and out by pinion 31 and segment gear 32. Screw 30 is slidably mounted in bracket 33 which is secured to the framework 34. Segment gear 32 is fixed on shaft or stud 35 by a nut 36, and shaft 35 is freely journaled in the bearing 37 which depends from the framework 34. An operating handle 38 is fixed on the outer end of shaft 35 for rotating the same when the friction brake is to be adjusted manually.

It will be seen that during the operation of the motor 12, the sliding member 14 of the governor 13 will assume a normal position on shaft 11, in which position a constant friction will be exerted between disk 15 and the friction material 26. Any tendency toward increased speed of motor 12 draws the disk 15 into firmer engagement with the friction material 26 so that the retarding influence of the brake is increased and thus the increased speed of the motor is checked. Should the power of the motor 12 tend to diminish, the pressure exerted by disk 15 against the friction material 26 is relieved so that the motor may continue to operate at the same speed. This normal speed is of course at all times under the control of the manual adjustment effected through the operation of lever 38.

The mechanism thus far described constitutes the adjustable constant speed motor drive for the phonograph. The reliable speed control above described, makes it possible to employ the same motor for supplying compressed air to a pneumatic repeating system, without interfering with the pitch of the tone being reproduced. A pressure of from one to two pounds, which may amply suffice for the pneumatic devices, may be generated in this way without perceptible variation in the speed of the motor. A pneumatic repeating system which I have employed for some time with entirely satisfactory results will now be described by way of example.

As illustrated in Fig. 11, the main shaft or arbor 3 of the phonograph has secured to it within the housing 9 an eccentric disk 50 running in oil, which operates a crosshead 51 mounted to slide in ways 52. The crosshead 51 is thus oscillated and during its operation causes a reciprocation of a piston rod 53 which passes through a bearing 54 and into a compressor cylinder 55 where it carries a piston 56. Cylinder 55 has a port 57 open to the atmosphere for permitting the escape of the trapped air behind the piston 56. A valve housing 58 is mounted on the outer end of cylinder 55 and contains passageways for the intake and discharge of air. The air intake occurs through the plug 59, the inner end of which forms a valve seat for the ball check valve 60. The discharge of compressed air takes place through the plug 61 past a ball check valve 62 which seats on an annular shoulder formed in the valve housing 58. The compressed air nipple 63 is threaded into the plug 61 and suitably communicates with the discharge passage therein. A pipe 64 is attached to nipple 63 and leads to a reservoir 65 (see Fig. 1). A safety valve 66 is inserted at the connection of pipe 64 with reservoir 65 to blow off at normal maximum pressure and thus maintain the supply of compressed air within reservoir 65 at constant pressure during the continued operation of the motor 12. A pipe 67 leads from safety valve 66 and has secured thereto a flexible soft rubber hose 68 which passes through a suitable automatic valve device and leads the compressed air to the actuating devices of the repeating system. For the sake of clearness I shall first describe the circuit of the compressed air from this point through the different actuating devices, and afterward consider in detail the operation of the automatic control valve by which the supply of compressed air to the actuating devices is governed.

Referring to Fig. 2, it will be seen that the compressed air is first led from hose 68 to a nipple 69 communicating with a pneumatic cylinder 70. A piston 71 is mounted in cylinder 70 and normally held forward by means of a spring 72. The compressed air entering the cylinder 70 operates the piston 71 against the spring 72 thereby raising the reproducing sound box and needle from the record as will be described. Having traversed a suitable portion of the cylinder 70 the piston in its further travel uncovers a port 73 from which leads the nipple 74 to a pipe 75 which conducts the compressed air thus escaping from cylinder 70 into an intermediate pneumatic cylinder 76 by way of port 77. A piston 78 in said cylinder 76 is thereby operated against the pressure of its return spring 79 while at the same time the compressed air is flowing through connection 80 into the pneumatic cylinder 81 of the shifting mechanism for the reproducer arm. Cylinder 81 has a piston 82 which operates a rod 83 pivotally connected with an arm 84 projecting from a collar 85 which is fixed to the base of the reproducer arm 86. The operation of piston 82 by the compressed air entering the cylinder 81 thus swings the reproducer arm 86 back to the starting point of the record, the needle and sound box having been previously elevated from the record by the action of piston 71 in cylinder 70. The reproducer arm is arrested by the engagement of the screwhead 87 with an adjustable stop 88 which is mounted in the jointed bracket 89 so as to be moved into and out of operative position. The raising of the needle and sound box is accomplished by means of piston rod 90 and push rod 91 secured to rod 90 by adjustable connection 92, and slidably mounted in the stationary sleeve 93 which is fixed in plate 94 secured on the neck 95 of the reproducer arm by means of the strap 96 and bolts 97, as illustrated in Figs. 2 and 15. The push rod 91 at its outer end engages an arm 98 which is adjustably secured to the U tube 99 by means of clamp 100. The outer end of piston rod 90 passes through the plate 94 and is guided therein. The sound box is illustrated at 101 and the needle rod at 102.

Coincidentally with the opening of the control valve which admits air to return the arm, the control valve is closed automatically by the returning arm, thereby shutting off the air supply. During this operation sufficient air has been supplied to the pneumatic devices to enable the accumulator or storage tank 76 to continue the return of the arm and hold the arm against stop 88 until the reproducer needle has been gradually lowered upon the record by the escapement valve which is made adjustable so as to regulate the rapidity at which the needle is lowered. The control valve I have herein illustrated is of simple and reliable construction, in the form of a pinch valve which engages the flexible soft rubber tube 68 to close the passageway. Referring to Fig. 2, this valve is shown as comprising the semi-circular abutment 103 which is mounted on or integral with an adjustable plate 104 pivoted to base plate 105 by means of screw 106 and fixed in adjusted position thereon by screw 107 which passes through the slotted end 108 of the plate 104. This abutment 103 thus constitutes a stationary valve member against which the moving valve member presses the rubber tube to close the passageway. The moving valve member is indicated at 109 and is mounted on or integral with the arm 110 which is pivotally secured to base plate 105 by means of screw 111. Valve member 109 is controlled by a roller 112 journaled on a stud 113, which extends vertically from a horizontal base 114 which is journaled in the bearings 115 and 116. (See Fig. 13.) A leaf spring 117 suitably mounted at the side of base plate 105 engages the projecting end of base 114 and tends to move it to the right in Fig. 13. The stud 113 passes through a slot 118 formed in base plate 105. Base plate 105 is fixed to the standard 119 by set screw 120. The roller 112 by reason of the mounting described is capable of moving bodily toward or away from the stationary cam member 103 and at the same time it may roll upon the moving cam member 109 (Figs. 3 and 4), the stud 113 during this latter motion rocking with the base 114. The roller 112 is under the control of an adjustable cam 121 formed as a segment of a circle, and grooved beneath to slide on a rib or flange 122 formed on shelf 123 projecting from the collar 85. The arm 84, above referred to, is slotted at 124 on the arc of a circle and through this slot a pin 125 passes into a recess formed in cam 121. Pin 125 is connected with the inner end of the cam adjusting rod 126 by means of the threaded coupling 127. The outer end of the cam adjusting rod 126 passes through the plate 94 (Fig. 15) and has secured thereon a thumb screw collar 128 and a collar 129, both of which collars are seated into plate 94 to prevent longitudinal motion of the adjusting rod 126.

It will be seen from the construction described, that the position of cam 121 with relation to arm 84 and reproducer arm 86, may be adjusted by turning the thumb screw 128, whereby the cam is moved toward or away from the outer end of the reproducer arm. It is also clear that the cam 121 will move relatively to the roller 112 when the reproducer arm moves. The position of cam 121 is so adjusted by the adjusting rod 126 that the cam will release the roller 112 when the reproducer arm arrives at the end of the record, so that the repeater devices are set in motion by the compressed air thus admitted. Having arrived at the termination of the record, the cam 121 which has been properly adjusted releases roller 112, whereupon the roller is thrown out of engagement with the valve member 109 by the action of leaf spring 117 and by the pressure of the flexible hose 68. The air is then admitted into cylinder 70, whereupon the piston 71 is moved outward and thus the push rod 91 is brought into engagement with the arm 98 and the reproducing needle is raised off the record. At the completion of this operation the piston 71 has uncovered the port 73 so that the compressed air is admitted into cylinders 76 and 81, storing a charge of compressed air in cylinder 76 while at the same time operating piston 82 in cylinder 81 so as to swing the reproducer arm back to the starting point of the record. The adjustable stop 88 has previously been adjusted to arrest the reproducer arm upon its arrival at the proper point on the record. In the act of arresting the reproducer arm, the screw head 87 is engaged by the stop 88. Screw head 87 may form a part of an adjustable escape valve operating stem 130 which upon the engagement of head 87 with stop 88 is caused thereby to open a by-pass, whereby the pressure in the actuating devices, and especially in cylinder 70, is permitted to escape. Preferably however the escape valve is manually adjusted as illustrated instead of being automatically operated, and the escape of air through the escape valve is continuous but not at a sufficient rate to prevent the described operation of the pneumatic devices.

With the escape of this pressure the piston 71 returns to normal position under the influence of spring 72, thus permitting the sound box and reproducer needle to return to the record. Prior to the opening of the by-pass by the valve operating stem 130, the reproducer arm has arrived at the beginning of the record, and in reaching this position the cam 121 which as before stated, swings with the arm, has again engaged the roller 112 and forced it against the valve member 109 thus pinching the tube 68 against the stationary valve member 103 and cutting off further supply of compressed air to the actuating devices. The cylinder 76 serves as a storage reservoir for the supplemental supply of compressed air for insuring the completion of the return of reproducer arm 86 after the supply of compressed air has been discontinued by the shutting-off of valve 109.

The electric switch by which the supply current to the motor 12 is controlled is illustrated in Figs. 1 and 17 to 19. Referring especially to Fig. 1, the connection with the line is made by the plugging-in switch 150 from which the conductors 151, 152 and 153 lead to and from the motor 12. The local switch is inserted between conductors 152 and 153. These conductors are connected with binding posts 154 and 155 which have terminal plates 156 and 157 in position to be bridged by the plunger contact 158. The local switch is mounted on the base 105. The plunger 158 has a narrow extension passing under the edge of base plate 105 from which a pin having a roller 159 extends upwardly through a slot 160 of base plate 105. The extension terminates in an upward bend 161 passing through a slot 162 in the base plate 105 and provided with a ball 163. The slot 160 is provided with a shoulder 164 (see Fig. 17) against which the roller 159 is normally held during the closed position of the switch by means of a spring 165 which is mounted in a recess of switch base 166 and operates against a sleeve 167 which abuts against the enlargement of the switch plunger. The circuit may be opened by engaging the ball 163 to free the roller 159 from shoulder 164. This may be effected manually or automatically. To effect this operation automatically, the collar 85 which is fixed on the base of the reproducer arm 86, has a radial extension 168 (Fig. 2). For automatically stopping, the jointed bracket 89 is thrown out of the path of the screw-head 87 so that the reproducer arm 86 is free to go beyond the beginning of the record, whereupon the radial projection 168 will swing into engagement with the ball 163 and throw the roller 159 out of engagement with the shoulder 164, so that the switch is thrown open under the influence of the opening spring 165.

The outer portion of the switch plunger 158 may be constructed in the form of a brake shoe 169 so as to apply a brake to a moving part of the apparatus, for example the turntable, as illustrated in Fig. 1.

I claim:

1. Apparatus of the character described comprising in combination a phonograph having a record support to be driven, pneumatic repeating devices, a compressor for supplying air thereto, a motor operatively connected with said record support and said compressor, and means for maintaining the speed of said motor constant.

2. Apparatus of the character described comprising in combination a phonograph having a record support to be driven, pneumatic repeating devices, a compressor for supplying air thereto, a motor operatively connected with said record support and said compressor, and adjustable means for maintaining the speed of said motor constant.

3. Apparatus of the character described comprising in combination a phonograph having a rotary record support to be driven, pneumatic repeating devices, a compressor for supplying air thereto, an eccentric disk rotating with said record support, a cross head operated thereby and operatively connected with said compressor, and a constant speed motor drive for said rotary record support.

4. A repeating phonograph comprising in combination a reproducer arm and needle, pneumatic devices for first raising the needle and then shifting the arm, means for supplying air to said pneumatic devices, and a control valve for said air supply controlled by the movement of said arm.

5. A repeating phonograph comprising in combination a reproducer arm and needle, pneumatic devices for first raising the needle and then shifting the arm, means for supplying air to said pneumatic devices, a control valve for said air supply, and adjustable valve actuating means operated by the movement of said arm.

6. A repeating phonograph comprising in combination a reproducer arm and needle, a pneumatic device for raising the needle, a second pneumatic device controlled thereby for shifting the arm, and means for supplying air to said pneumatic devices.

7. A repeating phonograph comprising in combination a reproducer arm and needle, adapted to follow the record, pneumatic devices for first raising the needle and then shifting the arm, a valve for controlling the supply of air to said pneumatic devices, valve actuating means moving with said arm to open said valve at the ending of the record, and a stop for arresting said arm upon its return to the commencement of the record.

8. A repeating phonograph comprising in combination a reproducer arm and needle, adapted to follow the record, pneumatic devices for first raising the needle and then shifting the arm, a valve for controlling the supply of air to said pneumatic devices, adjustable valve actuating means moving with said arm, means for setting said actuating means to operate upon arrival of said arm at the end of the record, and adjustable means for arresting the arm upon its return to the commencement of the record.

9. A repeating phonograph comprising in combination a reproducer arm and needle, adapted to follow the record, pneumatic devices for first raising the needle and then shifting the arm, means for supplying air thereto, a control valve for said air supply, a cam carried by said arm and an intermediate roller engaged thereby for actuating said valve.

10. A repeating phonograph comprising in combination a reproducer arm and needle, adapted to follow the record, pneumatic devices for first raising the needle and then shifting the arm, means for supplying air thereto, comprising a flexible hose, a stationary valve member and a movable valve member between which said hose extends, a swinging roller adapted to engage said movable valve member to shut off the air supply through said hose, and a cam carried by said arm for moving said swinging roller into engagement with said movable valve member.

11. A repeating phonograph comprising in combination a reproducer arm and needle, adapted to follow the record, pneumatic devices for first raising the needle and then shifting the arm, means for supplying air thereto, comprising a flexible hose, an adjustable stationary valve member and a moving valve member between which said hose is led, a swinging roller adapted to engage said moving valve member to close the hose, a spring tending to force said roller away from said moving valve member, and an adjustable cam carried by said arm and adapted to hold said roller against said moving valve member during a predetermined range of movement of said arm.

12. A repeating phonograph comprising in combination a reproducer needle and arm, adapted to follow the record, pneumatic repeating devices for first raising the needle and then shifting the arm, an air supply therefor, automatic means for admitting air to said devices at the completion of the record for raising the needle and shifting the arm, and adjustable means for releasing the air therefrom.

13. Apparatus of the character described comprising in combination a phonograph having a rotary part to be driven and a reproducer arm and needle, automatic repeating devices for said arm and needle, a stop movable into and out of arm arresting position for arresting the shifted arm at the commencement of the record, a constant speed motor drive for said rotary part, a current supply circuit for said motor drive, and an automatic throw-out switch for said circular operated by the shifted arm when said stop is out of arm arresting position.

14. Apparatus of the character described comprising in combination a phonograph having a rotary part to be driven and a reproducer arm and needle adapted to follow the record, automatic repeating devices for first raising the needle and then shifting the arm, a stop movable into and out of arm arresting position to arrest the shifted arm at the commencement of the record, a constant speed motor drive for said rotary part, a circuit for supplying current to the motor thereof, an automatic throw-out switch for said circuit, means carried by said arm for operating said throw-out switch when said arm arresting stop is out of arm arresting position, and a brake carried by said throw-out switch for arresting the rotation of said rotary part when said throw-out switch is operated.

15. Apparatus of the character described comprising in combination a phonograph having a reproducer arm and needle adapted to follow the record, automatic means for first raising the needle and then shifting the arm, a stop movable into and out of arm arresting position to arrest the shifted arm at the commencement of the record, an automatic brake, and means carried by said arm for controlling the application of said automatic brake by the movement of said arm when said arresting stop is out of arm arresting position.

ALBERT F. MADDEN.

Witnesses:
M. A. SAWYER,
WM. A. COURTLAND.